Sept. 22, 1953      E. SPERISEN      2,653,062
BEARING
Filed Dec. 19, 1949
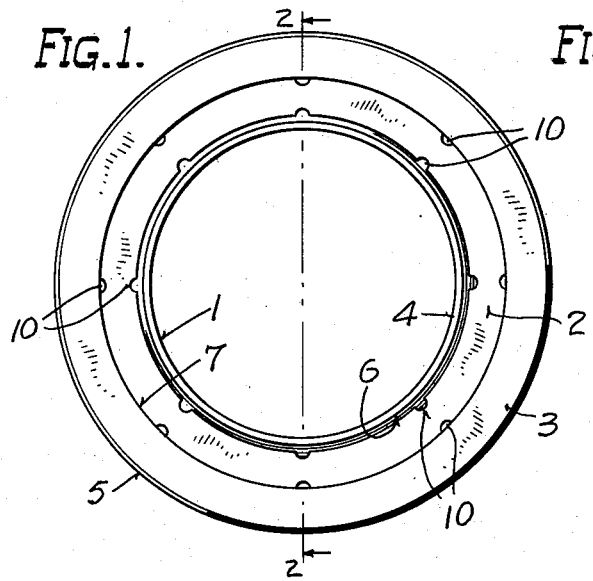
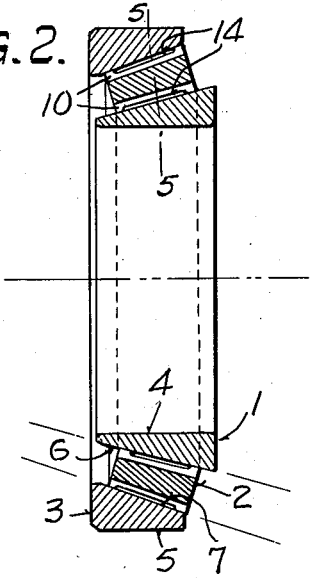
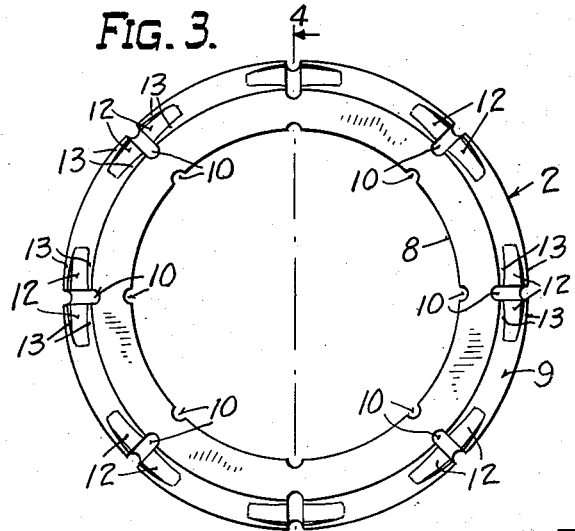
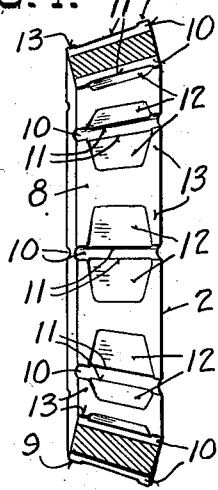
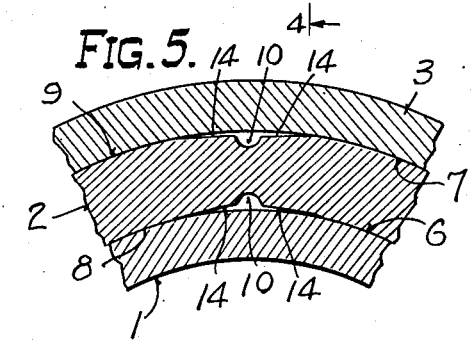
INVENTOR.
Ernest Sperisen
BY Andrus & Starke
ATTORNEYS.

Patented Sept. 22, 1953

2,653,062

UNITED STATES PATENT OFFICE 2,653,062

BEARING

Ernest Sperisen, Sun Prairie, Wis., assignor to Gisholt Machine Company, Madison, Wis., a corporation of Wisconsin Application December 19, 1949, Serial No. 133,800

2 Claims. (Cl. 308—73)

This invention relates to a bearing which has been adapted for use in connection with spindles where tapered roller bearings have heretofore been generally used.

One object of the invention is to provide a bearing for spindles or the like which is of such construction as to be satisfactorily lubricated under all load or running conditions.

Another object is to provide a bearing which is capable of taking both radial and thrust loads with increased ease and smoothness of operation.

Another object is to provide a bearing which permits increased accuracy of running.

Another object is to provide a bearing which gives better support for a lathe spindle or the like thereby permitting more accuracy of finished product especially when used in connection with relatively heavy work.

Another object is to provide a bearing which consists of relatively few parts, thereby being more economical to manufacture and which provides longer bearing life in that it is of rugged construction.

Other objects and advantages of the invention will appear hereinafter.

The invention is illustrated in the accompanying drawing in which:

Figure 1 is a front elevational view of the bearing of the invention;

Fig. 2 is a sectional view taken on line 2—2 of Fig. 1;

Fig. 3 is a front elevational view of the center ring of the bearing;

Fig. 4 is a sectional view taken on line 4—4 of Fig. 3;

Fig. 5 is an enlarged fragmentary sectional view taken on line 5—5 of Fig. 2; and Fig. 6 is an enlarged fragmentary perspective view of a grooved portion of the center ring.

According to the invention the bearing consists of an inner ring 1, a center ring 2, and an outer ring 3.

The ring 1 may be separate from or integral with the spindle or shaft. Similarly, ring 3 may be constructed separate from or integral with the supporting housing. Either ring 1 or ring 3 should be removable and axially adjustable of the other ring to provide for assembly and adjustment of the bearing.

The inner surface 4 of inner ring 1, and the outer surface 5 of outer ring 3 are generally parallel with respect to one another and to the longitudinal center line of the bearing.

The outer surface 6 of the inner ring and the inner surface 7 of the outer ring are preferably angular with respect to the longitudinal center line to provide a conical bearing where end thrust forces are employed. The angle of the conical bearing may be chosen to suit the conditions present and for increased axial thrust an increased angle may be employed. The inner and outer races may be fabricated from any suitable metal.

Center ring 2 is formed so that its inner and outer surfaces 8 and 9 respectively, complement surfaces 6 and 7 when the center ring is assembled between the inner and outer race.

Ring 2 may be formed of any suitable metal but it has been determined that bronze or various copper bearing alloys are suitably adaptable for the rigorous service to which the member is subjected.

A series of grooves 10 extend from one edge of ring 2 to the opposite edge and are equally spaced around the inner and outer peripheries of the ring. The edges 11 of grooves 10, on both surfaces of the center ring, are relieved to a relatively short depth, for instane a few thousandths of an inch, from which surfaces 12 taper gradually outwardly to both opposite bearing surfaces of the center ring as best seen in Fig. 6.

The tapered surfaces 12 constituting reliefs in edges 11 of grooves 10 extend for a substantial distance across the face of the center ring but do not quite cover the full width of the ring so that bearing surfaces 13 remain on either side of the surfaces 12. The tapered surfaces 12 extend outwardly circumferentially from the edges 11 as heretofore described to form pockets or recesses 14 on either side of grooves 10 and between bearing surfaces 13 as best seen in Figs. 5 and 6. Oil in which the bearing runs is pocketed in the recesses 14, and when in operation in either direction the oil, by reason of its adhesion to the metal, is wedged in the tapered opening and finally pressed between the revolving parts, thus assuring a positive lubrication to all bearing surfaces.

The angle of the taper 12 relative to the circular bearing surface should be sufficiently small to prevent any substantial resistance against the flow of lubricant from the pocket to the bearing surface. The build-up of pressure of the lubricant in the pocket tends to force it along the taper to the bearing surface and the lubricant wedging into the extreme tip of the pocket tends to maintain the oil pressed between the bearing surfaces. In general it will be desirable to employ an angle substantially less than 1°.

Where a conical bearing is employed the lubricant should be introduced at the end of smallest diameter so that full advantage is taken of centrifugal action in lubricating the bearing.

It will thus be seen that the invention not only provides a bearing particularly suitable for heavy work because of the maximum amount of bearing surface available but also provides a bearing in which all the surfaces are assured of positive lubrication at all times.

Various embodiments of the invention may be employed within the scope of the accompanying claims.

I claim:

1. A bearing comprising an outer race and an inner race, a conical ring disposed between said races in bearing engagement therewith, said ring having a plurality of circumferentially spaced grooves extending substantially across the width of the inner and outer peripheral conical surfaces of the ring and adapted to admit lubricant from the inner ends of the grooves to the bearing surfaces between the ring and said races, and a substantially wide and shallow pocket extending outwardly from the trailing edge of each of the grooves and tapering radially outwardly from the edge of the corresponding groove to the corresponding inner or outer peripheral surface of the ring to provide wedge shaped lubricant receiving receptacles between said races and said ring for delivery of lubricant to all contacting surfaces of the bearing, the side edges of the pockets being tapered to assist in the wedging action upon the lubricant as the ring rotates relative to said races.

2. A conical bearing comprising an outer race and an inner race, one of said races being axially adjustable relative to the other to provide for minimum predetermined bearing clearances therebetween, a frusto-conical ring disposed between said races in bearing engagement therewith for substantially the full circumference thereof for heavy rotary bearing loads, and a plurality of circumferentially spaced grooves extending substantially across the width of the inner and outer peripheral conical surfaces of said ring and open at the end of the ring of smallest diameter to receive lubricant, the bearing surfaces adjacent the grooves being recessed centrally to form a substantially wide and shallow pocket tapering outwardly from the trailing edge of each corresponding groove and serving to form the lubricant into a continuous film wedged between the interengaging conical bearing surfaces of the ring and races.

ERNEST SPERISEN.

References Cited in the file of this patent

UNITED STATES PATENTS

| Number | Name | Date |
| --- | --- | --- |
| Re. 15,058 | Heina | Mar. 8, 1931 |
| 1,236,511 | Waring | Aug. 14, 1917 |
| 2,106,860 | Tibbetts | Feb. 1, 1938 |
| 2,362,667 | Schmidt | Nov. 14, 1944 |

FOREIGN PATENTS

| Number | Country | Date |
| --- | --- | --- |
| 380,660 | Great Britain | Sept. 22, 1932 |
| 553,673 | Great Britain | June 1, 1943 |
| 915,604 | France | Nov. 13, 1946 |